(12) United States Patent
Stoyke (10) Patent No.: US 10,678,191 B2
(45) Date of Patent: Jun. 9, 2020

(54) METHOD FOR OPERATING AN AUTOMATION ARRANGEMENT

(71) Applicant: Broetje-Automation GmbH, Rastede (DE)

(72) Inventor: Markus Stoyke, Friesoythe (DE)

(73) Assignee: Broetje-Automation GmbH, Rastede (DE)

( * ) Notice: Subject to any disclaimer, the term of this patent is extended or adjusted under 35 U.S.C. 154(b) by 19 days.

(21) Appl. No.: 15/304,143

(22) PCT Filed: Apr. 15, 2015

(86) PCT No.: PCT/EP2015/058146
§ 371 (c)(1),
(2) Date: Oct. 14, 2016

(87) PCT Pub. No.: WO2015/158763
PCT Pub. Date: Oct. 22, 2015

(65) Prior Publication Data
US 2017/0038745 A1    Feb. 9, 2017

(30) Foreign Application Priority Data
Apr. 15, 2014   (DE) .................. 10 2014 105 381

(51) Int. Cl.
*G05B 11/01*      (2006.01)
*G05B 19/414*     (2006.01)
*G05B 19/05*      (2006.01)

(52) U.S. Cl.
CPC ............ *G05B 11/01* (2013.01); *G05B 19/056* (2013.01); *G05B 19/4145* (2013.01); *G05B 2219/34287* (2013.01)

(58) Field of Classification Search
CPC .. G05B 11/01; G05B 19/056; G05B 19/4145; G05B 2219/34287
See application file for complete search history.

(56) References Cited

U.S. PATENT DOCUMENTS 6,024,477 A    2/2000  Bauer et al.
7,747,718 B2   6/2010  Shirane et al.
(Continued)

FOREIGN PATENT DOCUMENTS

DE       19634279      2/1998
DE    102004051179     6/2005
(Continued)

OTHER PUBLICATIONS

Kuchlin et al. "HIGHROBOT: A High-performance Universal Robot Control on Parallel Workstations" from "Engineering of Computer-Based Systems, 1997. Proceedings., International Conference and Workshop on, pp. 444-451".*
(Continued)

*Primary Examiner* — Yuhui R Pan
(74) *Attorney, Agent, or Firm* — Pauly, DeVries Smith & Deffner LLC (57) ABSTRACT

A method for operating an automation arrangement, having a manipulator and an input/output module for automated production and also a computer apparatus uses the computer apparatus to execute a PLC computer program for providing a programmable logic controller for the input/output module, which PLC computer program is communitively connected to the input/output module via a module bus for the purpose of actuating said input/output module. The method is characterized in that the computer apparatus is used to execute a cell control computer program for actuating the PLC computer program via a PLC interface of the PLC computer program, in that the cell control computer program provides an NC controller for the manipulator and in that the cell-control computer program is communicatively connected to the manipulator via a network bus for the purpose of actuating said manipulator.

18 Claims, 4 Drawing Sheets

(56) References Cited

U.S. PATENT DOCUMENTS

| | | | | |
|---|---|---|---|---|
| 2002/0013639 A1* | 1/2002 | Fujishima | ............... | B23Q 41/08 700/175 |
| 2009/0150705 A1* | 6/2009 | Gmeiner | ........... | G05B 19/41825 713/400 |
| 2016/0179085 A1* | 6/2016 | Seitz | ..................... | G05B 19/414 700/180 |

FOREIGN PATENT DOCUMENTS

| | | |
|---|---|---|
| DE | 10357824 | 7/2005 |
| EP | 1586967 | 10/2005 |
| WO | 2005059664 | 6/2005 |
| WO | 2015158763 | 10/2015 |

OTHER PUBLICATIONS

"German Search Report," for patent application DE102014105381.8 dated Dec. 1, 2014 (7 pages).

"Google search KUKA.PLC," Jun. 18, 2015, XP055196669, retrieved from the internet: URL:https://www.google.de/search?q=communicate+implement+diagnose+kuka.plc&hl=de&source=Int&tbs=cdr%3A1%2Ccd_min%3A%2Ccd_max%3A15.04.2014&tbm= (retrieved on Jun. 18, 2015), 2 pages.

"International Preliminary Report on Patentability," for corresponding PCT application No. PCT/EP2015/058146 dated Oct. 18, 2016 (10 pages).

"International Search Report and Written Opinion," for corresponding PCT application No. PCT/EP2015/058146 dated Jun. 24, 2015 (9 pages).

"Kmc—KUKA Motion Control—For Everything that Moves in Automation: PC-Based KUKA Motion Control," Feb. 1, 2004, pp. 1-16, XP055196673, retrieved from the internet: URL:http://www.unisgroup.com/br/pdf/Kuka-KRC2-Controller-Brochure.pdf (retrieved on Jun. 18, 2015), 16 pages.

Kuchlin, W., et al. "HIGHROBOT: A High-performance Universal robot Control on Parallel Workstations" International Conference and Workshop on Engineering of Computer-Based Systems: Mar. 24-28, 1997 Monterey, California: Proceedings. pp. 444-451 (8 pages).

"Kuka.Plc," Apr. 4, 2005, pp. 1-6, XP055196671, retrieved from the Internet: URL:http://www.gspnexus.com/brochure/28_eng.pdf [retrieved on Jun. 18, 2015], 6 pages.

Po-Nagen, W. "Real-time Inter-processing for PC Based Robot Controllers in Tele-robotic and Gantry Robotic Controller System," Proceedings of the 2008 IEEE International Conference on Robotics and Biomimetics. Bangkok, Thailand, Feb. 21-26, 2009 pp. 1585-1589 (5 pages).

\* cited by examiner

METHOD FOR OPERATING AN AUTOMATION ARRANGEMENT

CROSS-REFERENCE TO RELATED APPLICATIONS

This application is a national stage application under 35 U.S.C. 371 of Inter-national Patent Application Serial No. PCT/EP2015/058146, entitled "Verfahren zum Betrieb einer Automatisierungsanordnung," filed Apr. 15, 2015, which claims priority from German Patent Application No. DE 10 2014 105 381.8, filed Apr. 15, 2014 the disclosure of which is incorporated herein by reference.

FIELD OF THE TECHNOLOGY

The application relates to a method for operating an automation arrangement.

BACKGROUND

The prior art discloses programmable logic controllers (PLCs) that can be used in automation engineering to program and automatically actuate actuators, particularly end effectors and provision systems, and also sensors and other functional units of a machine or installation. A functional element of this kind, which is actuatable by a programmable logic controller, in principle, is generally referred to both individually and in a combination, here and subsequently, as an input/output module. Conventionally, these programmable logic controllers have been provided by devices and electronic arrangements provided specifically for this purpose. Habitually, such programmable logic controllers communicate with the input/output module that they are configured to actuate via a bus, such as e.g. a field bus.

In the meantime, programmable logic controllers whose functionality is provided by a computer program executed on a computer are also known. Such a computer program can be referred to as a PLC computer program, the system operated using such a PLC computer program being able in turn to be referred to as a soft PLC as a whole. There is thus no further provision for special hardware for the programmable logic controller, but rather its functionality is formed by a computer program that runs on a conventional computer or on an industrial PC or embedded PC tailored to the automation environment. For the purpose of actuating the input/output modules, such a computer may accordingly likewise be connected to a field bus.

The prior art and specifically EP 1 586 967 A2, on which the present invention is based, also disclose expansions through software for such a PLC computer program. One such known expansion can e.g. be used to allow communication with a specific device by a driver or the like. However, the expansions presented in this prior art are expansion modules such as e.g. dynamic program libraries or DLLs (dynamic-link libraries) that can be addressed or incorporated by the PLC computer program. They are thus ultimately under the software control of the PLC computer program in this case. There is no provision for control of the programmable logic controller for software purposes by this expansion.

When automation cells are part of an automation system, it is habitually the case that an input/output module actuated by a programmable logic controller is arranged on a manipulator, which is e.g. a multi-axis robot. Specifically, the input/output module may be arranged at the tool center point (TCP) of the manipulator.

Such a manipulator habitually has its movements actuated by a numerical controller, here and subsequently referred to as an NC controller. This NC controller can also, in principle, be provided by a computer program executed on a computer. The provision of the input/output module on the manipulator closely relates the activities performed by the input/output module—which are prescribed e.g. by the PLC computer program—and the movements of the manipulator—which are in turn controlled by the NC controller.

SUMMARY

Against this background, the object of the disclosure is to improve a method for operating an automation arrangement, and particularly an automation arrangement in which the functionality of a programmable logic controller is provided by a computer program, such that improved integration between the computer program for the programmable logic controller and an NC controller for the actuation of a manipulator is made possible.

The cited problem is solved for a method for operating an automation arrangement as described herein.

An essential aspect of the invention is the insight that, besides a PLC computer program for providing a programmable logic controller, and in a manner superordinate to said programmable logic controller in terms of software, there is a cell control computer program provided on the computer apparatus, which cell control computer program firstly actuates the input/output module by actuating the interface of the PLC computer program and secondly provides the function of an NC controller, this cell control computer program itself then performing the actuation of the manipulator and of other components.

In other words, this cell control computer program forms the superordinate—for software purposes—"roof" that has all the necessary functions for the automation arrangement, including the PLC functionality, under its control and in this way can coordinate them with one another. In this case, the functionality of the PLC computer program can be accessed in modular fashion, this PLC computer program being able to be introduced into the overall system as a component that is already present. This standardization under the roof of the cell control computer program can also outwardly provide a standard interface of the system as a whole but in turn allows actuation of the automation arrangement in a standard manner.

An embodiment relates to advantageous bus systems for linking the input/output modules and the manipulators to the computer apparatus.

Various embodiments describe meaningful splits for the PLC computer program or the cell control computer program within an operating system and a process structure of the computer apparatus.

An embodiment describes advantageous possibilities for interprocess communication on the computer apparatus between the cell control computer program and the PLC computer program that meet particularly the synchronization demands on these two programs.

Various embodiments describe the embodiment of an NC processor as part of the cell control computer program and its specific interaction with the PLC computer program, on the one hand, and the actuation of the manipulator, on the other.

As described by various embodiments, an object-oriented software architecture is used to great advantage for this actuation of the manipulator and other access operations.

An embodiment provides a method for operating an automation arrangement, for operating an automation cell, having a manipulator and an input/output module for automated production and also a computer apparatus, wherein the computer apparatus is used to execute a PLC computer program for providing a programmable logic controller for the input/output module, which PLC computer program is communitively connected to the input/output module via a module bus for the purpose of actuating said input/output module, wherein the computer apparatus is used to execute a cell control computer program for actuating the PLC computer program via a PLC interface of the PLC computer program, in that the cell control computer program provides an NC controller for the manipulator and in that the cell-control computer program is communicatively connected to the manipulator via a network bus for the purpose of actuating said manipulator.

In various embodiments, the input/output module has an application apparatus, such as a tool, a measuring apparatus or a receptacle, that is arranged on the manipulator.

In various embodiments, the module bus is a field bus and/or in that the network bus is an Ethernet bus, particularly a realtime Ethernet bus.

In various embodiments, the cell control computer program is communicatively connected to a sensor apparatus via the network bus for the purpose of reading the sensor apparatus.

In various embodiments, the cell control computer program provides a cell control interface via a factory bus, to which factory bus the cell control computer program is communicatively connected.

In various embodiments, the computer apparatus is a personal computer, such that the PLC computer program and the cell control computer program run on a multimedia operating system for a personal computer.

In various embodiments, the PLC computer program and the cell control computer program are each executed by different processes.

In various embodiments, an NC computer subroutine of the cell control program for providing the NC controller is executed in an NC process and in that a manipulator subroutine of the cell control computer program for actuating the manipulator is executed in a manipulator process.

In various embodiments, the computer apparatus provides multiple interprocess channels for communication with the PLC computer program with at least partly different prioritization, such that the NC computer subroutine and a visualization program executed in a visualization process each use an interprocess channel to communicate with the PLC computer program and the interprocess channel of the NC computer subroutine has higher priority than that of the visualization program.

In various embodiments, the cell control computer program has an NC processor for translating an NC program into switching commands for actuating the input/output module, such as for translating an NC program into geometry data and/or technology data for actuating the manipulator, particularly also into sensor queries for reading the sensor apparatus.

In various embodiments, the NC processor executes a computation routine for trajectory planning for the manipulator, such as comprising a kinematic transformation and/or an interpolation, based on the geometry data and/or the technology data.

In various embodiments, the NC processor executes the switching commands by virtue of the cell control computer program accessing the PLC interface of the PLC computer program, and the PLC computer program responding to the access by actuating the input/output module via the module bus.

In various embodiments, the NC processor actuates the manipulator, and can also read the sensor apparatus, particularly also executes the computation routine, by accessing an encapsulation interface of the cell control computer program and in that, in response to the access, the manipulator is actuated via the network bus, and, if need be, the sensor apparatus is also read via the network bus, particularly, if need be, trajectory planning is also performed.

In various embodiments, the access to the encapsulation interface and/or to the PLC interface comprises the access to an object-oriented interface class having the nature of a manipulator class, of an input/output module class, of a sensor class and/or of a trajectory planning class.

In various embodiments, the manipulator class, the input/output module class and/or the sensor class are implemented by a manipulator object, an input/output module object and a sensor object, respectively, which are dependent on the type of the manipulator, of the input/output module and of the sensor apparatus, respectively.

BRIEF DESCRIPTION OF THE FIGURES

Further details, features, aims and advantages of the present invention are explained below with reference to the drawings, in which.

DETAILED DESCRIPTION

The method according to the proposal is used for operating an automation arrangement 1 having a manipulator 2a, b and an input/output module 3a, b, the manipulator 2a, b and the input/output module 3a, b each being configured for automated production.

Figure 1:
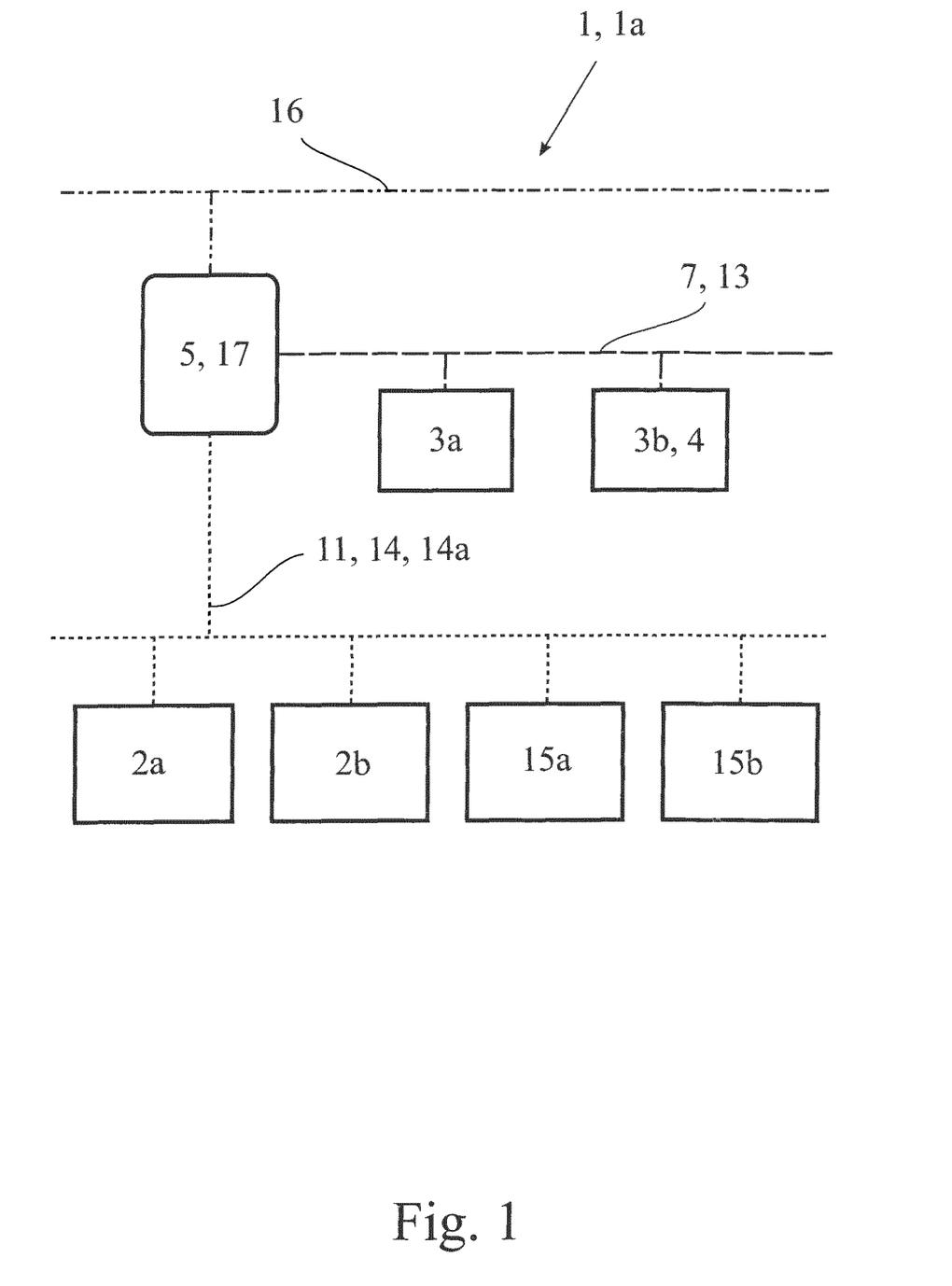
FIG. 1 shows a schematic representation of an automation arrangement for performing the method according to the proposal.
Figure 3:
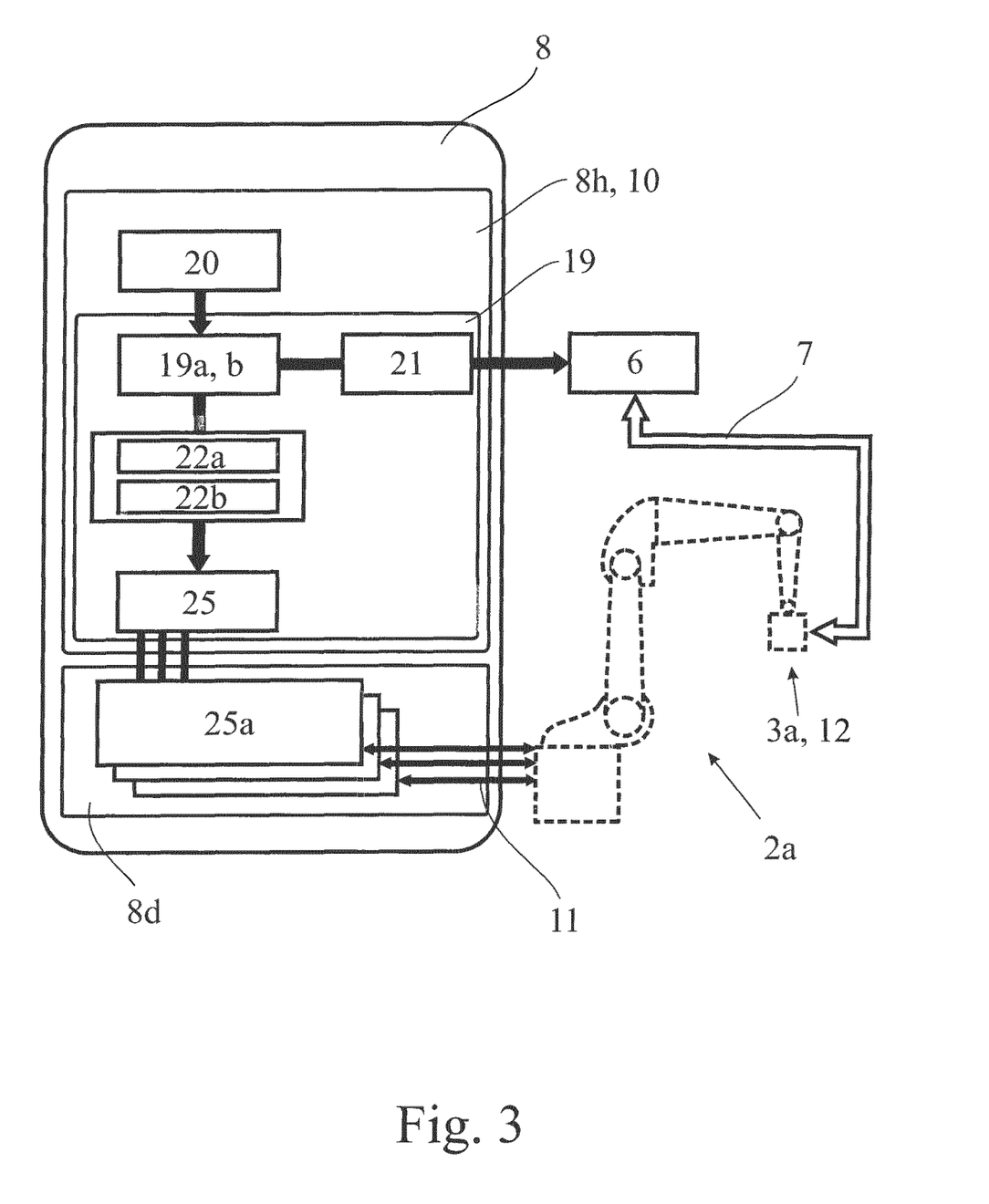
FIG. 3 shows a schematic representation of the flow of data for a cell control computer program according to the automation arrangement of FIG. 1.

Such an automation arrangement 1 is shown in FIG. 1, two manipulators 2a, b and two input/output modules 3a, b being provided in this case, of which the input/output module 3b is a safety module 4. This safety module 4 can provide an emergency off functionality, for example. FIG. 3 shows only one manipulator 2a and one input/output module 3a.

The automation arrangement 1 that is intended to be operated using the method according to the proposal further has a computer apparatus 5. The automation arrangement 1 may particularly be an automation cell 1a, that is to say a modular arrangement for automation within a larger automation system e.g. of a larger factory.

According to the proposal, the computer apparatus 5 is used to execute a PLC computer program 6 for providing a programmable logic controller for the input/output module 3a, b, the PLC computer program 6 being communicatively connected to the input/output module 3a, b via a module bus 7 for the purpose of actuating said input/output module.

The method according to the proposal is now characterized in that the computer apparatus 5 is used to execute a cell control computer program 8 for actuating the PLC computer program 6 via a PLC interface 9 of the PLC computer program 6, in that the cell control computer program 9 provides an NC controller 10 for the manipulator 2a, b and in that the cell control computer program 8 is communicatively connected to the manipulator 2a, b via a network bus 11 for the purpose of actuating said manipulator.

As in the present case, the manipulator 2a, b may be a multi-axis manipulator, and particularly a six-axis manipulator. The computer apparatus 5 may also consist of multiple individual computer units. Similarly, both the PLC computer program 6 and the cell control computer program 8 may be constructed from a series of individual computer programs that can each also be executed in a separate process. Details in this regard are described below.

In an embodiment, the input/output module 3a, b has an application apparatus 12 arranged on the manipulator 2a, b. The input/output module 3a, b may also consist of such an application apparatus 12. This application apparatus 12 may be arranged particularly at the tool center point of the manipulator 2a, b, and it may be a tool, a measuring apparatus or a receptacle in this case. The application apparatus 12 can then be actuated particularly by the PLC computer program 6 by virtue of actuation of the input/output module 3a, b itself.

Further, the module bus 7 can be a field bus 13. Alternatively or additionally, the network bus 11 may be an Ethernet bus 14, with particularly a realtime Ethernet bus 14a being possible in this case. A realtime Ethernet bus 14a is an Ethernet bus based on a protocol that provides a realtime capability.

Similarly, the cell control computer program 8 can be communicatively connected to a sensor apparatus 15a, b via the network bus 11 for the purpose of reading the sensor apparatus 15a, b. In the exemplary embodiment of FIG. 1, the sensor apparatus 15a is a line scanner and the sensor apparatus 15b is a camera or a camera system, each individual camera of the camera system then being able to be embodied differently.

Figure 2:
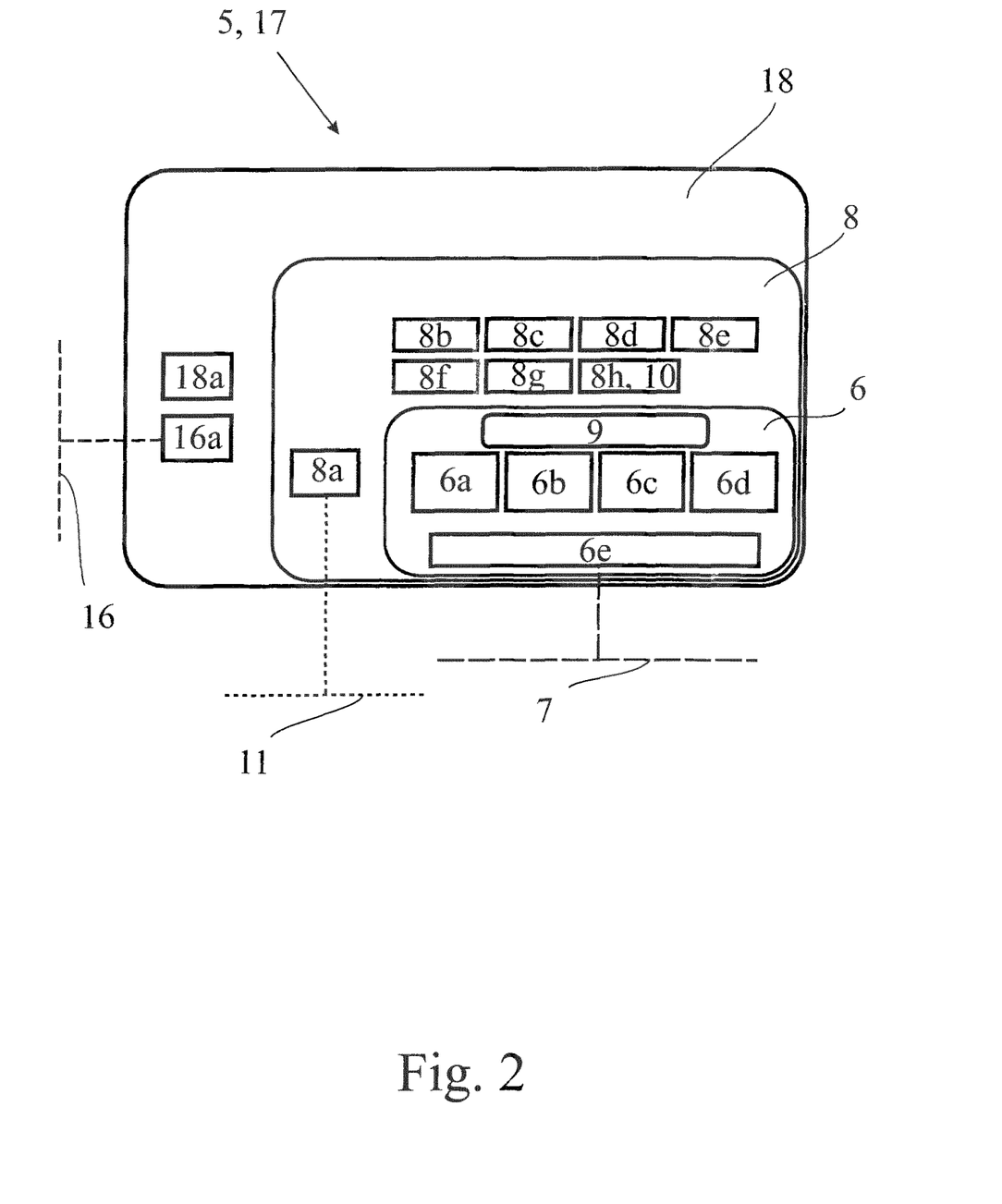
FIG. 2 shows a schematic representation of the software structure on the computer apparatus of the automation arrangement of FIG. 1.

The automation arrangement 1 and specifically the automation cell 1a can—as already stated—be part of a larger automation system, which is controlled e.g. centrally, together with other automation arrangements. In such a case, there can be provision for the cell control computer program 8 to provide a cell control interface via a factory bus 16, for which factory bus 16 the cell control computer program 8 is communicatively connected. An appropriate factory bus driver 16a is shown in FIG. 2. In this way, a central computer that controls multiple automation cells can also access the automation cell 1a and specifically the cell control computer program 8 on the computer apparatus 5.

In principle, the computer apparatus 5 may be any computer-type apparatus, for example specifically an industrial computer or another microprocessor system. However, the computer apparatus 5 can be a personal computer 17. This provides the opportunity for not only the cell control computer program 8 but also other computer programs to be executed flexibly on the computer apparatus 5. A further option in this case is for the PLC computer program 6 and the cell control computer program 8 to run on a multimedia operating system 18 for a personal computer 17.

This relationship is shown schematically in FIG. 2. In this representation, it is first of all possible to identify the PLC computer program 6, which implements different function blocks, in the present case the end effector function 6a, a supply system 6b for a tool, a workpiece database 6c and safety functions 6d. Each such function may be implemented by a separate module for software purposes. For the communicative connection to the module bus 7, a module bus driver 6e is provided. The interface to the outside—for software purposes—forms the PLC interface 9 already described above.

The cell control computer program 8 addresses the PLC computer program 6 via this PLC interface 9. At the same time, the cell control computer program 8 has a network bus driver 8a for the communicative connection to the network bus 11. Other, in particular software-oriented, modules of the cell control computer program 8 are a visualization module 8b, a diagnosis module 8c, a robot module 8d, a normality sensor module 8e, a position sensor module 8f, a laser sensor module 8g and an NC module 8h. These modules communicate among one another. Further, there may be still further modules provided.

Outside the cell control computer program 8, and on the operating system, which in this case is the multimedia operating system 18, there now in turn runs—besides the above factory bus driver 16a for the communicative connection to the factory bus 16—a configuration module 18a, which allows e.g. access to the cell control computer program 8 via a conventional user interface of the multimedia operating system 18 for configuration purposes.

A further option is for the PLC computer program 6 and the cell control computer program 8 each to be executed by different processes. In the present case, the term process is intended to be understood for software purposes. Both the PLC computer program 6 and the cell control computer program 8 can each be executed by a single process in this case. However, it may also be that the PLC computer program 6 and the cell control computer program 8 are each executed by a multiplicity of different processes. The split for the PLC computer program 6 or the cell control computer program 8 over the single processes can correspond to the split into the modules shown in the representation of FIG. 2 or to a similar split in this case, but it is also possible for multiple modules to be combined and to be executed in a single process. In this case, it may also be that some modules are provided at least in part by the operating system, for example the drivers.

An optional split for the cell control computer program 8 into different processes provides for an NC computer subroutine of the cell control computer program 8 for providing the NC controller 10 to be executed in an NC process and for a manipulator subroutine of the cell control computer program 8 for actuating the manipulator 2a, b to be executed in a manipulator process. In this case, the manipulator process is thus different than the NC process. The NC controller 10—and hence the NC computer subroutine—processes NC commands that relate firstly to an actuation of the input/output module 3a, b and secondly to an actuation of the manipulator 2a, b. The information obtained from the NC commands in relation to the actuation of the manipulator 2a, b, that is to say "purged" of the information in relation to the actuation of the input/output module 3a, b, can then be processed by the manipulator subroutine. This NC subroutine for providing the NC controller 10 may—as shown in the representation in FIG. 3—be the NC module 8h of FIG. 2, and the manipulator subroutine of the cell control computer program may be the robot module 8d of FIG. 2.

The PLC interface 9 of the PLC computer program 6 can, in principle, be addressed by any programs and accordingly from different processes. Firstly, it is addressed by the cell control computer program 8 for the purpose of actuating the input/output module 3a, b, and secondly, the PLC interface 9 is also used to provide data for retrieval that can then be presented on a screen of the computer apparatus 5, for example by the visualization module 8b of the cell control computer program 8.

It may also be that system processes of an operating system of the computer apparatus 5 and particularly of the multimedia operating system 18 need to access the PLC interface 9 of the PLC computer program 6. To produce synchronization between the actions of the input/output module 3a, b and the movements of the manipulator 2a, b, access for actuating the input/output modules 3a, b is habitually more important and particularly more time critical than visualization on a screen, for example.

Therefore, the computer apparatus 5 can provide multiple interprocess channels for communication with the PLC computer program 6, specifically with different prioritization at least in part. In the present instance, prioritization means the order in which a relevant communication via such an interprocess channel is processed by the operating system, a communication via an interprocess channel with a higher priority being reacted to more quickly than a communication via an interprocess channel with a lower priority. Specifically, a process having a higher priority can interrupt a process having a lower priority that is currently being processed. This can be accomplished firstly by virtue of a single process providing the communication via the interprocess channels and handling said communication on the basis of the respective priority of the interprocess channels. Alternatively or additionally, each interprocess channel may be allocated to a process with a priority corresponding to the priority of the interprocess channel, with the respective process then being handled on the basis of its priority.

Further, the NC computer subroutine and a visualization program can be executed in a visualization process each to communicate with the PLC computer program 6 via an interprocess channel and for the interprocess channel of the NC computer subroutine to have a higher priority than that of the visualization program. This takes account of the described circumstance that the actuation by the NC computer subroutine is more important and needs to be executed more quickly than a visualization.

Figure 4:
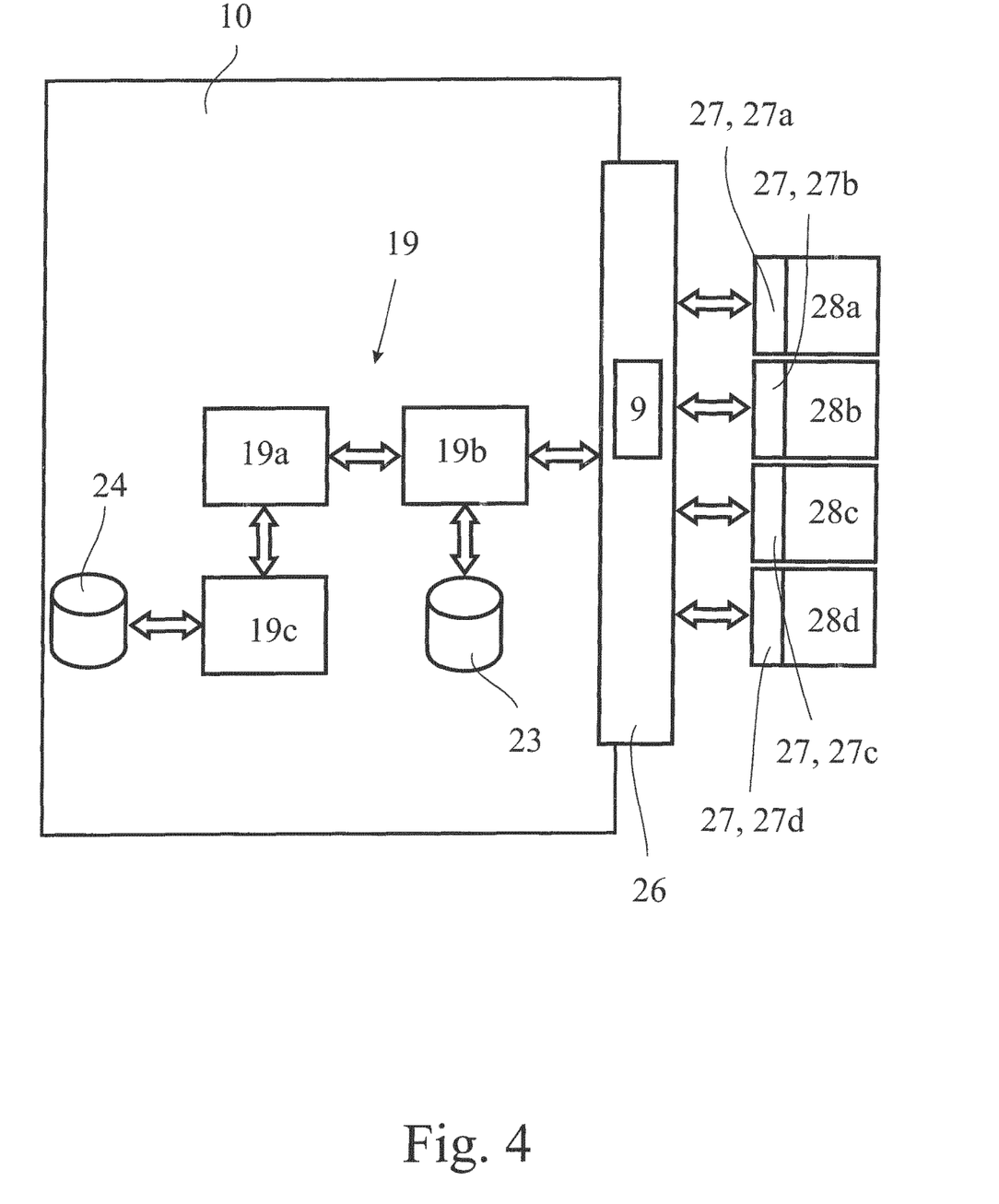
FIG. 4 shows a schematic representation of the architecture of the cell control computer program of FIG. 3.

Referring to the representation of FIG. 3 and FIG. 4, there can be provision for the cell control computer program 6 to have an NC processor 19 for translating an NC program 20 into switching commands 21 for actuating the input/output module 3a, b. Alternatively or additionally, the NC processor 19 may also be configured to translate the NC program 20 into geometry data 22a and/or into technology data 22b for actuating a manipulator 2a, b. The respective representation of FIG. 3 and FIG. 4 is complementary insofar as FIG. 3 primarily shows the flow of processing for the data and FIG. 4 describes the software design of the interfaces.

The NC processor 19 can firstly consist of multiple modules that are each executed in a separate process. Alternatively, the NC processor 19 as a whole can be executed in one process, this particularly being able to be the NC process above. Hence, the NC processor 19 may particularly correspond to or be comprised by the NC computer subroutine above. Consequently, the NC processor may also be formed by the NC module 8h above.

The NC program 20 above is, then, a succession of NC commands that are composed in a plain text. This is also referred to as G code. G code can comprise G commands or else M commands and general parameters. The NC processor 19 comprises an NC interpreter 19a and an NC command converter 19b, which has access to a command database 23.

The NC interpreter 19a and the NC command converter 19b translate the plain text of the NC program 20 into geometry data 22a and/or technology data 22b, on the one hand, in each case for the purpose of actuating the manipulator 2a, b, and switching commands 21 for actuating the input/output module 3a, b, on the other. In this case, production of the switching commands 21 can also be based on the technology data 22b.

The NC program 20 may also comprise references to or dependencies on sensor data, which means that there can be provision for the NC processor 19 also to be configured to translate the NC program 20 into sensor queries for reading the sensor apparatus 15a, b.

In the present example, the NC processor 19 also comprises an NC data collector 19c that stores automatically generated data records in a protocol database 24 during execution of the NC program.

Further, there is provision for the NC processor 19 to execute a computation routine 25 for trajectory planning for the manipulator 2a, b on the basis of the geometry data 22a and/or on the basis of the technology data 22b. In various embodiments, the trajectory planning performed by the computation routine 25 comprises a kinematic transformation, that is to say a conversion from Cartesian coordinates to axial coordinates or vice versa. Alternatively or additionally, the trajectory planning performed by the computation routine 25 can also comprise an interpolation. Based on the results of the computation routine 25, it is then possible for one or more position controllers 25a of the manipulator 2a to be supplied with reference variables. This variant corresponds to the representation of FIG. 3. As a departure from this representation, the computation routine 25 can also be provided by the robot module 8d.

According to a further variant, this computation routine 25 performs the above kinematic transformation, but not the trajectory planning. In the present case, on the basis of the kinematic transformation, a robot controller—not shown—of the manipulator 2a, b is supplied with the results of the kinematic transformation. Both the trajectory planning and the functionality of the above position controllers 25a are then accordingly provided by this robot controller.

For the input/output module 3a, b, there is specific provision for the NC processor 19 to execute the switching commands 21 by virtue of the cell control computer program 8—of which the NC processor 19 is part, of course—accessing the PLC interface 9 of the PLC computer program 6, and the PLC computer program 6 responding to the access by actuating the input/output module 3a, b via the module bus 7.

For this access and other access operations, there may be a specific type of encapsulation provided in this case, as shown hereinbelow again with reference to FIG. 4. Specifically, there can be provision for the NC processor 19 to actuate the manipulator 2a, b, such as also to read the sensor apparatus 15a, b, particularly also to execute the computation routine 25, by accessing an encapsulation interface 26 of the cell control computer program 8, and for, in response to the access, the manipulator 2a, b to be actuated via the network bus 11. A further option is for, possibly in response thereto, the sensor apparatus 15a, b also to be read via the network bus 11 and, further, particularly also trajectory planning to be performed in response to the access.

Both this access to the encapsulation interface 26 and the access to the PLC interface 9 can be effected by means of an object-oriented interface class. Therefore, in some embodiments the access to the encapsulation interface 26 and/or to the PLC interface 9 can comprise the access to an object-oriented interface class 27 having the nature of a manipulator class 27a, of an input/output module class 27b, of a trajectory planning class 27c and/or of a sensor class 27d.

Hence, the same interface—for the actuation of a manipulator, of an input/output module, of a trajectory planning routine or of a sensor, respectively—is thus always provided for these access operations, and any differences are encapsulated in the implementation. It is specifically possible for the access to the PLC interface 9 to comprise the access to the input/output module class 27b.

These are now taken into consideration in that the manipulator class 27a, the input/output module class 27b and/or the sensor class 27d can be implemented by a manipulator object 28a, an input/output module object 28b and a sensor object 28d, respectively, which are dependent on the type of the manipulator 2a, b, of the input/output module 3a, b and of the sensor apparatus 15a, b, respectively. Similarly, the trajectory planning class 27d may be implemented by a trajectory planning object 28d, which is dependent on the specific algorithms that are used to implement the trajectory planning and specifically the interpolation and the kinematic transformation.

The invention claimed is:

1. A method for operating an automation arrangement, comprising a manipulator and an input/output module for automated production and a computer apparatus, wherein the computer apparatus is used to execute a programmable logic controller (PLC) computer program for providing a programmable logic controller for the input/output module, which PLC computer program is communitively connected to the input/output module via a module bus for the purpose of actuating said input/output module,
   wherein the computer apparatus is used to execute a cell control computer program, wherein the cell control computer program is configured to directly actuate the PLC computer program via a PLC interface of the PLC computer program, wherein the cell control computer program provides a numerical controller (NC) for the manipulator and wherein the cell-control computer program is communicatively connected to the manipulator via a network bus for the purpose of actuating said manipulator,
   wherein the cell control computer program has an NC processor for translating an NC program into switching commands for actuating the input/output module, and
   wherein the NC processor executes the switching commands by virtue of the cell control computer program accessing the PLC interface of the PLC computer program, and the PLC computer program responding to the access by actuating the input/output module via the module bus.

2. The method as claimed in claim 1, wherein the input/output module has an application apparatus that is arranged on the manipulator.

3. The method as claimed in claim 1, wherein the module bus is a field bus and/or wherein the network bus is an Ethernet bus.

4. The method as claimed in claim 1, wherein the cell control computer program is communicatively connected to a sensor apparatus via the network bus for the purpose of reading the sensor apparatus.

5. The method as claimed in claim 1, wherein the cell control computer program provides a cell control interface via a factory bus, to which factory bus the cell control computer program is communicatively connected.

6. The method as claimed in claim 1, wherein the computer apparatus is a personal computer.

7. The method as claimed in claim 1, wherein the PLC computer program and the cell control computer program are each executed by different processes.

8. The method as claimed in claim 1, wherein an NC computer subroutine of the cell control program for providing the numerical controller is executed in an NC process and wherein a manipulator subroutine of the cell control computer program for actuating the manipulator is executed in a manipulator process.

9. The method as claimed in claim 1, wherein the computer apparatus provides multiple interprocess channels for communication with the PLC computer program with at least partly different prioritization.

10. The method as claimed in claim 1, wherein the NC processor executes a computation routine for trajectory planning for the manipulator.

11. The method as claimed in claim 1, wherein the NC processor actuates the manipulator.

12. The method as claimed in claim 11, wherein the NC processor reads a sensor apparatus by accessing an encapsulation interface of the cell control computer program and in that, in response to the access, the manipulator is actuated via the network bus.

13. The method as claimed in claim 12, wherein the access to the encapsulation interface and/or to the PLC interface comprises the access to an object-oriented interface class having the nature of a manipulator class, of an input/output module class, of a sensor class and/or of a trajectory planning class.

14. The method as claimed in claim 13, wherein the manipulator class, the input/output module class and/or the sensor class are implemented by a manipulator object, an input/output module object and a sensor object, respectively, which are dependent on the type of the manipulator, of the input/output module and of a sensor apparatus, respectively.

15. The method as claimed in claim 6, wherein the PLC computer program and the cell control computer program run on a multimedia operating system for a personal computer.

16. The method as claimed in claim 9, wherein the NC computer subroutine and a visualization program executed in a visualization process each use an interprocess channel to communicate with the PLC computer program and the interprocess channel of the NC computer subroutine has higher priority than that of the visualization program.

17. The method as claimed in claim 10, wherein the computation routine comprises a kinematic transformation and/or an interpolation, based on geometry data and/or technology data.

18. The method as claimed in claim 12, wherein the sensor apparatus is also read via the network bus.

* * * * *